United States Patent [19]

Schapker

[11] Patent Number: 4,859,007
[45] Date of Patent: Aug. 22, 1989

[54] INTERLOCKING DISK STORAGE WITH SLIDING-DISPERSED ACCESS

[76] Inventor: Richard L. Schapker, 134 Farnum St., North Andover, Mass. 01845

[21] Appl. No.: 891,161

[22] Filed: Jul. 31, 1986

Related U.S. Application Data

[63] Continuation-in-part of Ser. No. 752,925, Jul. 8, 1985, abandoned.

[51] Int. Cl.$^4$ .............................................. A47B 81/06
[52] U.S. Cl. ........................................ 312/12; 312/13; 312/108
[58] Field of Search ...................... 312/12, 13, 50, 111, 312/108, 118, 136; 211/50, 58, 40, 41, 47, 48; 16/225, DIG. 13; 248/157, 297.5; 206/387

[56] References Cited

U.S. PATENT DOCUMENTS

| | | | |
|---|---|---|---|
| 1,455,565 | 5/1923 | Briggs | 312/12 |
| 2,278,529 | 4/1942 | Beder | 312/12 |
| 3,743,372 | 7/1973 | Ruggerone | 312/108 |
| 4,069,618 | 1/1978 | Geiss | 49/183 |
| 4,493,417 | 1/1985 | Ackeret | 312/12 X |

FOREIGN PATENT DOCUMENTS 16212 of 1928 Australia ............................... 312/12

*Primary Examiner*—James T. McCall
*Attorney, Agent, or Firm*—Donald W. Meeker

[57] ABSTRACT

A slidable disk holder extends from a box structure a sufficient distance to permit dispersement of the disks. Means for simultaneous dispersement of all of the disk holders fit between each envelope-like disk holder. In an interconnecting tabular embodiment, tabs cut from the sides of each envelope-like holder connect each holder to an adjacent holder at a front end. Envelope extension surfaces interconnect inner ends of the envelopes slightly distant from the inner end of each envelope. The disks may be fanned out manually or, with pretensioned or spring actuated living hinges, the disks may fan out automatically upon release of a panel and notch locked into a base plate of the slidable disk holder. In another embodiment simultaneous dispersement is accomplished by a mechanically pivoting arm with a protrusion between each adjacent pair of envelope-like disk holders. Vertical or horizontal fanning may take place using living hinge connections to a slidable base plate. The box structure and its cover may both be lined interiorly with a metallic substance to protect the magnetic information stored on the disks. Flared protrusions extending from the top, bottom and sides of the box structure are slidably interlocked to connect boxes into self-supporting arrays.

29 Claims, 5 Drawing Sheets

INTERLOCKING DISK STORAGE WITH SLIDING-DISPERSED ACCESS

CROSS REFERENCE TO RELATED APPLICATION

This is a continuation-in-part application of copending U.S. application Ser. No. 06/752,925 filed 7/8/85 now abandoned in Group Art Unit 241.

BACKGROUND OF THE INVENTION

1. Technical Field

The present invention relates to storage for computer disks and in particular to interlocking storage modules having slide-out elements with means to fan out all of the disks for viewing and easy access.

2. Background Art

Prior storage elements for computer disks, including floppy disks and diskettes, generally do not provide adequate simultaneous dispersement of the disks for ease of viewing and access.

Storage containers for computer disks generally do not provide means for storing the containers themselves in an efficient manner, but users must rely on conventional bookshelves or other filing means which are not always appropriate or convenient.

The few disk storage containers which do attempt to separate the disks for viewing and access generally do so by dispersing the disks in a stepped fashion with adjacent disks remaining in contact with one another, thereby presenting some difficulty in withdrawing a single disk and the ever present danger of distorting or scratching one of the disks in t he process.

Currently, standard disk storage containers provide no means for protecting the information stored magnetically on the disks so that valuable information and hours of work might be lost should the disks be exposed to some devices which might erase or alter the information, such as electronic or metal detection devices.

None of the prior art storage means combine the advantages of modular interlocking self-stacking storage containers with slide-out fanned dispersement of the disks.

DISCLOSURE OF INVENTION

Fan-out dispersement of a number of disks simultaneously provides ease of viewing and manual access to help prevent the danger of scratching the disks and provide speed and efficiency in working with the disks.

Interconnecting adjacent disk holders at two points provides vertical stiffness and strength to allow the entire array to fan out in the same plane without sagging.

Fabricating each disk holder or envelope with two built-in contact parts to form a hinge and an interconnector out of a single strip of material provides ease, simplicity and low cost of manufacturing. Having the interconnecting element cut out of the actual holder itself and bending it out to attach it to a comparable interconnecting element on an adjacent holder allows the two elements to bend back into alignment with the holder surface in the storage mode. Therefore, direct contact of the adjacent holders with nothing in between requires a minimum of storage space.

Flared protruding elements running longitudinally along the top, bottom and both sides of the modular container allow interlocking of the storage modules in all directions for convenient self-stacking and efficient storage. Individual containers slide easily out of the stacked array for transporting without disturbing the remainder of the array.

Combining slide-out drawers in the modular containers affords great ease of access without having to remove the container from the array. Ease of operation is afforded by a simple pivot which fans out the disks. Interconnecting the fan mechanism with the slide element allows automatic dispersement of the disks.

Providing a secure door and lining the whole container with metal or metallic coating protects the disks against any possible outside electromagnetic or radio wave action which might otherwise alter or destroy the information stored magnetically on the disks.

Great ease of operation and storage is thereby provided in a modular unit which is inexpensive to manufacture by common plastic molding processes.

BRIEF DESCRIPTION OF THE DRAWINGS

These and other details and advantages of my invention will be described in connection with the accompanying drawings, which are furnished only by way of illustration and not in limitation of the invention, and in which drawings.

BEST MODE FOR CARRYING OUT THE INVENTION

Figure 1:
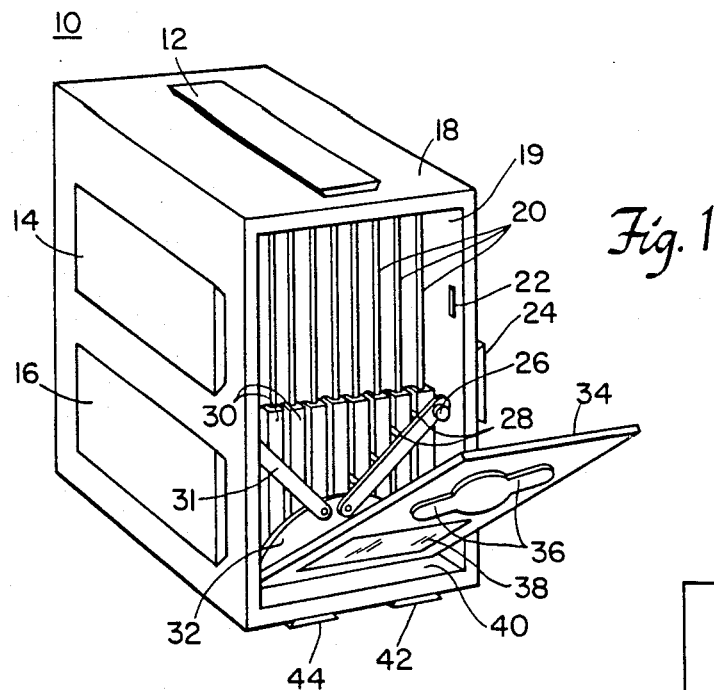
FIG. 1 is a perspective view of one embodiment of the invention.
Figure 2:
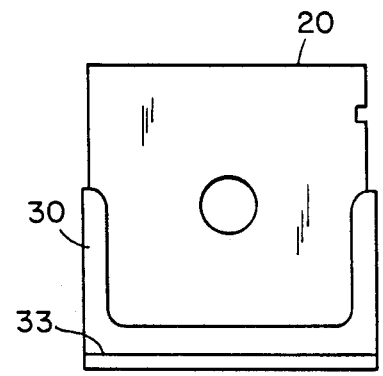
FIG. 2 is an elevational view of a U-shaped holder for a computer diskette.
Figure 3:
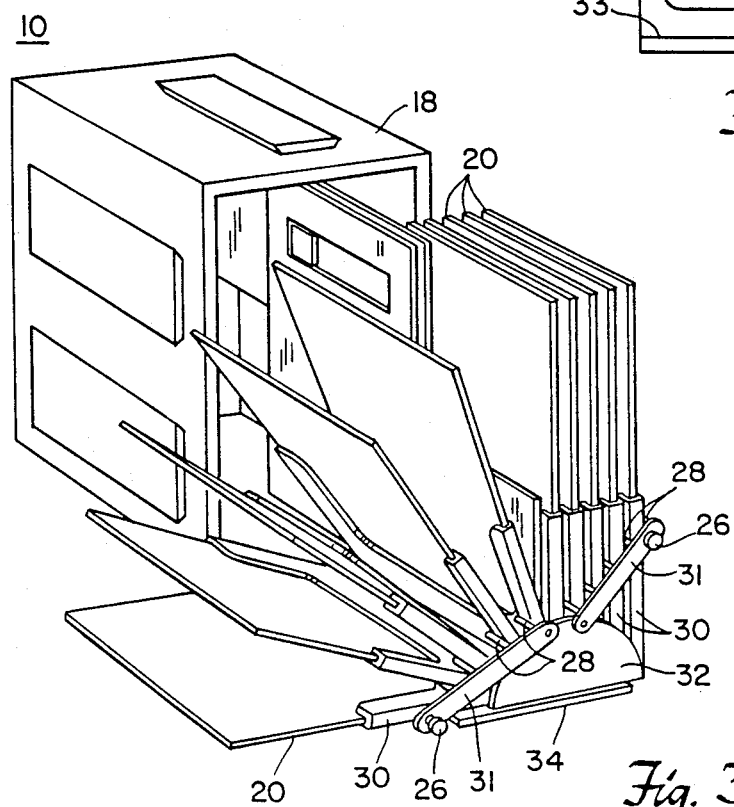
FIG. 3 is a perspective view of the embodiment of FIG. 1 with the diskettes in a partially fanned open position.
Figure 11:
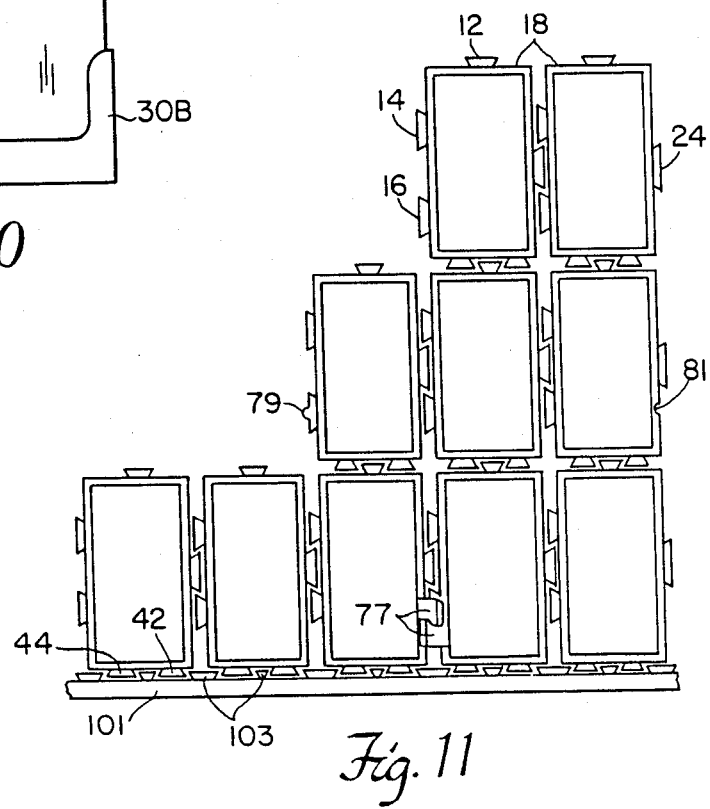
FIG. 11 is a front elevational view of the modular containers interlocked in a storage array.

In FIGS. 1, 2 and 3, one embodiment of the modular disk storage container 10 comprises a box structure 18 which may be formed of injection molded plastic. On the top, bottom and two sides of the box structure, flared protrusions form interlocking pairs on opposing sides of the box structure to create a self-supporting storage array as seen in FIG. 11. Each top flared protrusion 12 can be slidably inserted between the pair of spaced flared protrusions 42 and 44 on a bottom of a box structure located above or below. Each side flared protursion 24 may be slidably inserted between a pair of flared side protrusions 14 and 16 on an opposite side of a second box structure positioned adjacent to the first to the right or the left. In this fashion any desired shape array may be formed to secure the box structures together. Additional interlocking tabs 77 or protrusions 79 and matching detents 81 in the flared protrusions insure that the box structure array remains intact while disks are withdrawn. Any of the box structures may be easily withdrawn from the array for use elsewhere without interfering with the remainder of the array. A base 101 may be employed having flared protrusions 103 to receive the flared protrusions 42 and 44 of the bottom row of boxes slidably therein.

A hinged cover 34 may be sealed tightly and locked to secure the disks therein as with turning mechanism 36 which engages slots 22 in the sides of the box structure. The inner surfaces 19 of the box structure and the cover may then be lined with metal or a metallic coating to protect the magnetically encoded disks from external electromagnetic or radio waves, which might otherwise remove or alter the recorded information on the disks. The cover may also be provided with a label 38 for indicating the contents clearly.

Figure 4:
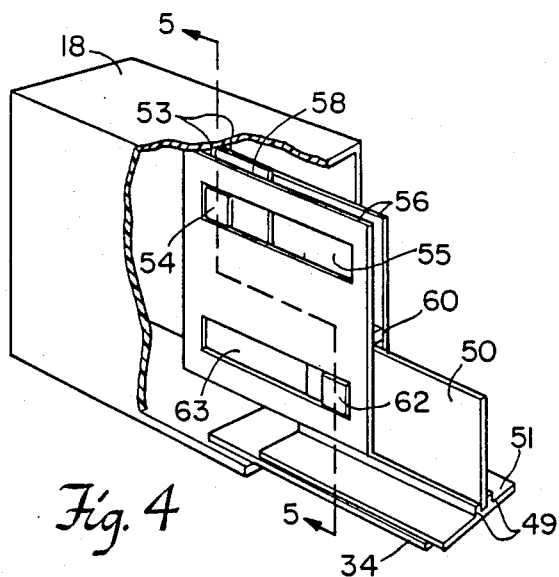
FIG. 4 is a perspective view in partial section of the components of the sliding element for withdrawing the diskettes from the modular container.
Figure 5:
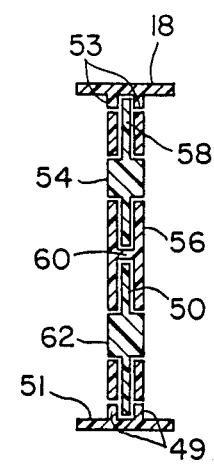
FIG. 5 is a cross-sectional view of the sliding element components pulled open taken through 5—5 of FIG. 4.

A sliding holder 32 may be pulled forward out of the box structure on a three component sliding element as seen in FIGS. 4 and 5. A stationary component 58 is secured in a ridge 53 along the top centerline of the box structure and extends vertically downward for half the height of the box structure and horizontally for the length of the box structure. Sandwiching the stationary component, a double vertical slider component 56 is provided with at least one upper slot 55 which receives at least one protrusion 54 from the stationary component 58. The slider component rides in and out of the box structure supported by the protrusion of the stationary component, but is prevented from leaving the box structure entirely by the protrusion engaging the slot to limit the outward movement. The third component comprises a vertical disk support component 50 which attaches to the sliding holder 32 and further attaches to a horizontal disk support 51 provided with a central longitudinal notch 49 to retain the vertical disk support. At least one protrusion 62 from the vertical disk support 50 slidably engages at least one lower slot 63 in the slider component 56 and the protrusion 62 from the vertical disk support component 50 rides on the lower slot 63. The vertical disk support 50 is free to slide out of the box structure to the extent that the disks 20 stored on the horizontal disk support 51 clear the box structure. The protrusion 62 in the lower slot 63 then stops the sliding motion to prevent the disk support components from leaving the box structure entirely. A longitudinal central connecting member 60 between the two sides of the slider component 56 serves to stabilize the sliding of the components as a guide along the bottom of the stationary component 58 and the top of the vertical disk support component 50. Other sliding arrangements which permit sliding the disks out just beyond the limits of the box structure would be acceptable.

In FIG. 3 the embodiment of the invention 10 provides a system for fanning the disks from a vertical storage position downwardly on each of two sides to form on each side a dispersed array of disks 20 having each disk spaced apart from an adjacent disk at an angle (approximately 18 degrees for an array of five disks). As seen in FIG. 2 each disk is held by an enveloping U-shaped frame-like holder 30 which is hinged to a base 35 connected to the horizontal disk support component 51 in FIG. 3. The hinge may be a living hinge 33 as in FIG. 2 formed in the frame itself or a conventional hinge. Pivotally attached to the sliding holder 32, an actuating arm member 31, provided with a knob 26 facing outwardly and a series of spaced protrusions 28 in the form of pegs facing inwardly, acts to separate the disks 20 and upon swinging the actuating arm downwardly fans open the disks separating them for easy viewing and manual selection.

Figure 6:
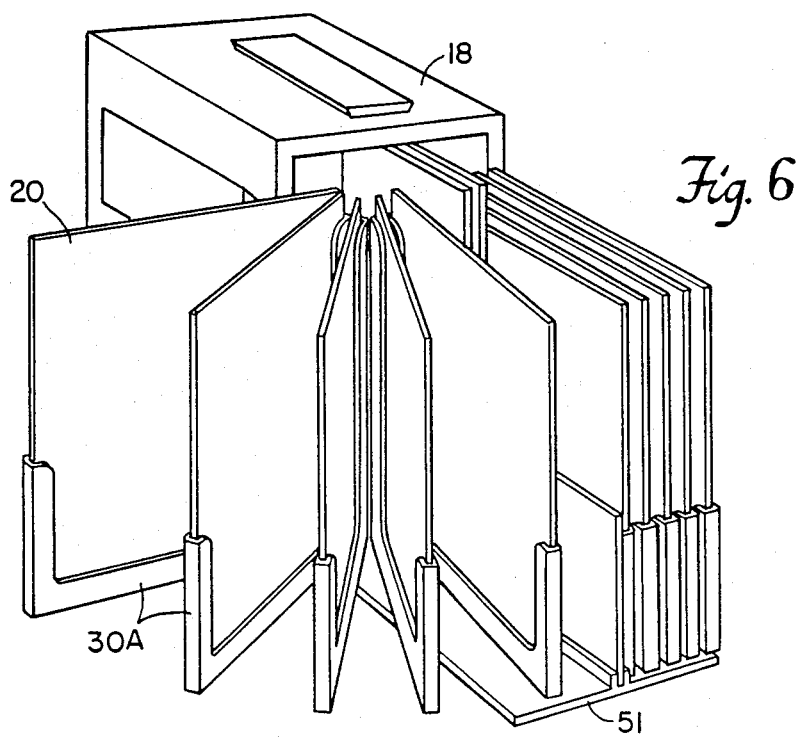
FIG. 6 is a perspective view of an alternate embodiment of the invention having the diskettes fanned open around a vertical axis.
Figure 7:
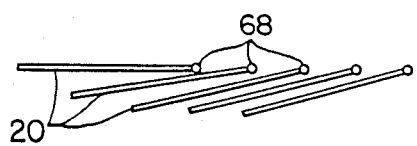
FIG. 7 is a schematic view of one fanning configuration with aligned pivot points.
Figure 8:
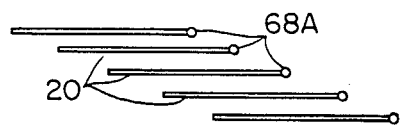
FIG. 8 is a schematic view of another fanning configuration with stepped pivot points and aligned diskettes.

In FIG. 6 an alternate embodiment of the sliding dispersing means comprises J-shaped disk holders 30A with an interior side longer than an outer side so that the interior longer sides are hinged vertically and the disks are fanned out to one side and the other again for easy viewing and selection of a disk 20. Alternate flaring modes employ aligned hinges 68 as in FIG. 7 for angled dispersement or stepped hinges 68A as in FIG. 8 for parallel dispersement.

Figure 9:
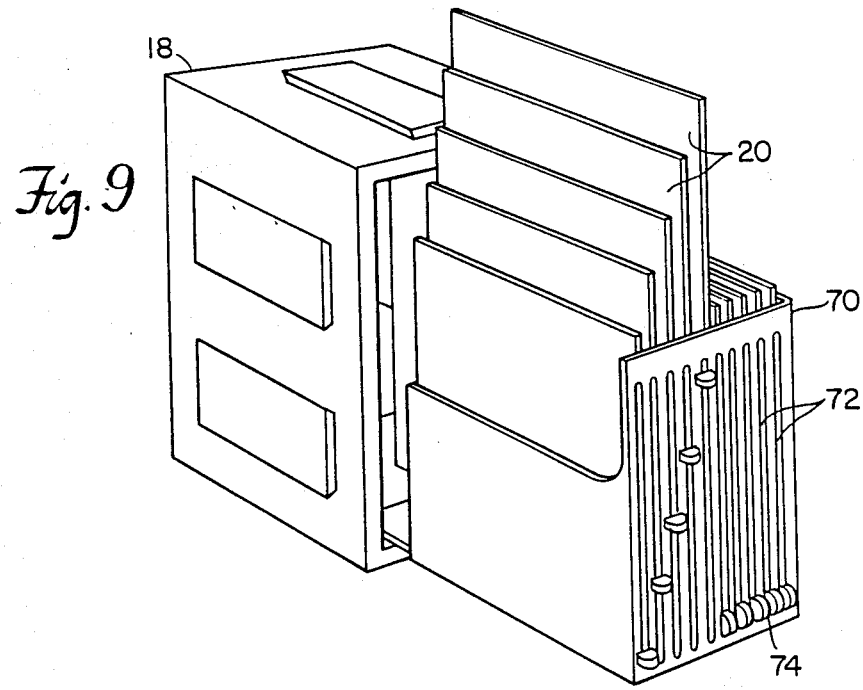
FIG. 9 is a perspective view of another alternate embodiment of the invention having a vertically splayed fan array for accessing the diskettes.
Figure 10:
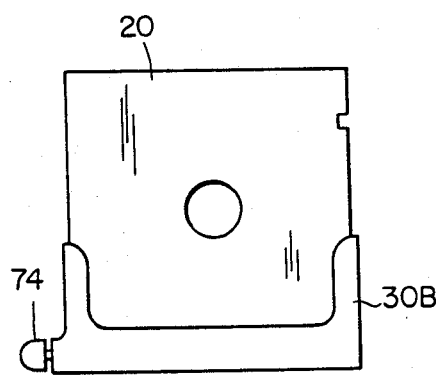
FIG. 10 is an elevational view of a diskette holder used in the vertically splayed fan array.

In FIGS. 9 and 10 the sliding dispersement utilizes a disk drawer 70 having a high front side with spaced vertical slots 72. Each U-shaped disk support frame 30B further comprises a turnable tab 74 extending from the front base of the disk support frame as indicated in FIG. 10. With the disks 20 stored vertically within the disk support drawer 70 each tab 74 protrudes through a slot 72 so that the tabs may be used to elevate each disk 20 as desired to view and select the desired disks. Each tab 74 is turned when the disk is at the desired height thereby locking the disk holder in place. Selection arrays such as a stepped array indicated herein may be formed for ease of viewing and selection of the disks.

Figure 12:
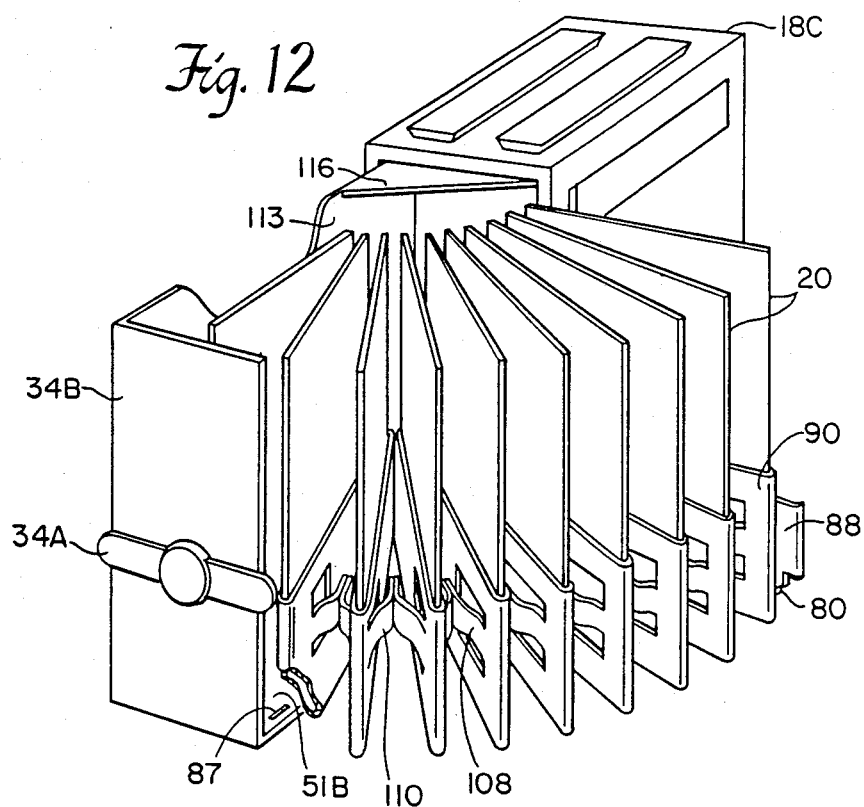
FIG. 12 is a perspective view of the preferred embodiment of the invention having envelope-type holders all fanned open simultaneously using interconnection tabs.

In FIG. 12 the preferred embodiment of the invention comprises a box structure 18C having a slidable member fitting slidably therein. The slidable member comprises a vertical wall surface 113 approximately the height of the box interior side wall surface and extending perpendicularly from the bottom of one side of the vertical wall surface a base plate 51B, slightly smaller than the interior floor surface of the box. Extending perpendicularly from the top rear of the vertical wall surface, a rigid winged protrusion 116 just slightly smaller than the interior width of the box, provides stability for the sliding member within the box in conjunction with the base plate for a smooth sliding action without tilting. A door structure 34B is attached to the front of the vertical wall and base plate to complete the rigid slidable member. This structure may be formed in one piece by injection molding. Rotatably attached to the outer surface of the door structure a turning lock 36A extends beyond the limits of the door sides to fit within slots 22, in FIG. 1, cut into the sides of the box structure. The box structure may be formed in two pieces by injection molding. A series of envelope-like holders 90 is movably attached to the slidable member.

Figure 16:
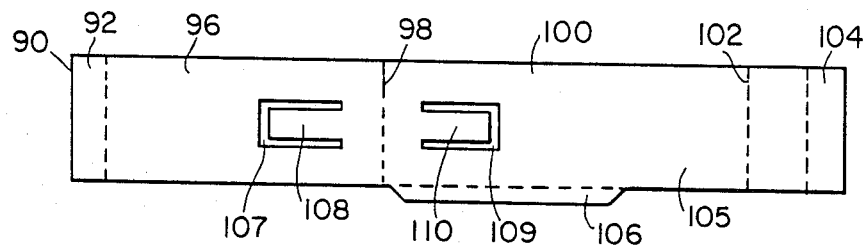
FIG. 16 is a side elevational view of a blank sheet of material used to form an envelope-type diskette holder.

In FIG. 16 an elongated flexible sheet of material 90 is stamped and bent to form the elements of the envelope-like holder. Each envelope-like holder is formed from an elongated substantially rectangular sheet of flexible material 90 bent transversely along a transverse line 98 away from the middle of the sheet to form a shorter portion 96 and a longer portion 100. The shorter portion 96 as folded over the longer portion 100 and an end strip 92 of the shorter portion attached to the longer portion to create a receiving portion for a disk-like object therebetween and leave a planar extension 105 at one end. An elongated tab 106 the length of the folded over portion secures the bottom of the receiving portion. On each side of the receiving portion 96 and 100 a U-shaped strip 107 and 109 respectively, is cut out to leave a horizontally positioned rectangular tab 108 and 110 which bends freely outward without contacting the sides of the receiving portions due to the width of the U-shaped cutout.

Figure 13:
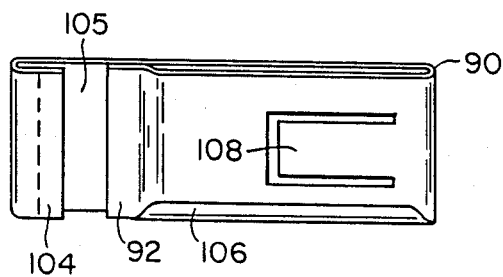
FIG. 13 is an elevational view of an envelope-type diskette holder.
Figure 14:
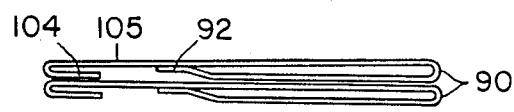
FIG. 14 is a top plan view of two envelope-type diskette holders in the storage position.
Figure 15:
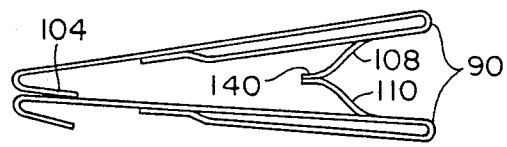
FIG. 15 is a top plan view of two envelope-type diskette holders in the fanned out position.

In FIGS. 13, 14 and 15 the envelope-like holders 90 are shown assembled for use. The attaching strip 92 and the bottom tab 106 are adhesively attached or heat sealed in place. Each envelope-like holder 90 is secured to each adjacent envelope-like holder 90 at two points. Attachment of the planar extension at its end strip 104 to the extended planar surface 105 of the adjacent envelope-like holder provides a resilient hinge means which allows for both fan-like angling motion and some lateral displacement between the two holders, as seen in FIG. 15. The end curved portion extending beyond the attachment strip allows for a spring-like action of the flexible material and a small lateral displacement. This provides much better accessibility to each disk. The attachment of the tabs 108 and 110 of adjacent envelope-like holders causes all of the holders to be fanned out simultaneously when an end holder is pulled out and provides additional stiffness to the entire series to help prevent sag when the holders are fanned out to their greatest extent.

Figure 17:
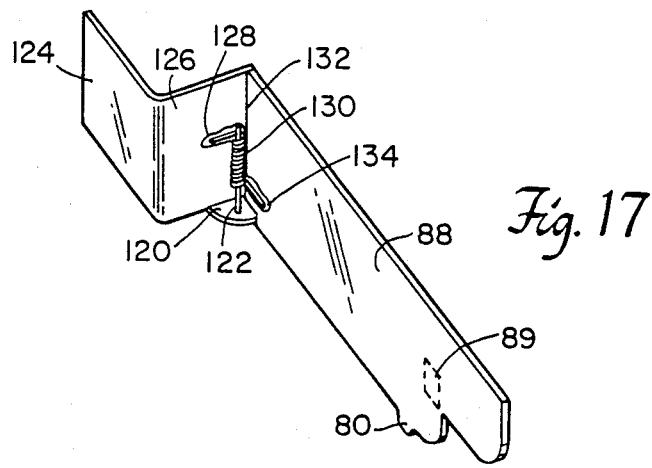
FIG. 17 is a partial perspective view of the gate and living hinge attaching configuration.

In FIG. 17 a holding plate 88 or gate-like member is pivotally attached to the slidable member at a rearward securing surface 124, and an envelope-like holder adjacent to the holding plate is secured to the holding plate at an attaching point 89 (indicated by dashed lines) by a tab cut from a side of the envelope-like holder at the outer end of the holders. The envelope-like holders are sandwiched between the vertical plate and the holding plate. The holding plate 88 further comprises a bottom edge provided with a downwardly protruding tab 80 which fits into a mating slot 87, seen in FIG. 12 in the base plate 51B to lock the envelope-like holders in a closed position for storage. A living hinge 132, formed in the holding plate in the normally flat position, creates a tension to help the holder array fan out automatically. The holding plate 88 further comprises a small shelf 120 extending inwardly of the end of the holding plate with an upwardly protruding post 122. A pretensioned spring 130 mounted on the post is biased to maintain the holding plate in an open position with the two active ends of the spring fitting securely in notches 128 and 134 formed on the interior walls of the housing plate. When the tab 80 is released from the slot 87 the entire array of envelope-like holders fans open automatically with all of the disks exposed simultaneously, as seen in FIG. 12.

Figure 18:
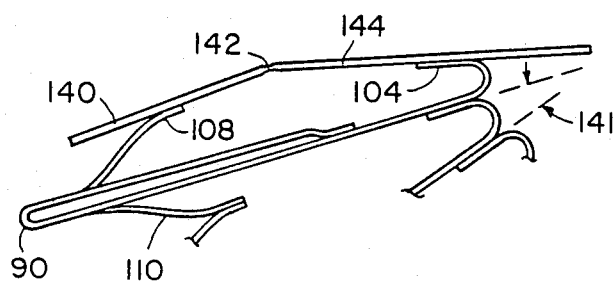
FIG. 18 is a partial top sectional view of the side wall attaching means.

In FIG. 18 an interior attaching plate 144 is attached to the vertical plate 113 of the slidable member. The interior envelope-like holder 90 in the array is attached to the interior attaching plate by adhesively securing the tab 108 of the holder to one end of the attaching plate while the extension plane of the holder is attached at its inwardly bent end strip 104 to an opposite end of the attaching plate. The living hinge 142 allows a portion of the attaching plate 140 to pivot outwardly and thereby provide greater dispersement of the disks. With an array of ten disk holders the angular differential 141 between each of the holders for a full 90 degree swing outwardly would be about 9 degrees.

Figure 19:
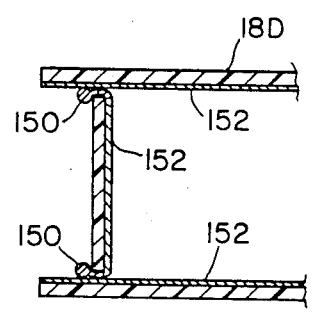
FIG. 19 is a cross-sectional view taken through the cover and a portion of the box structure showing interior shielding.

In FIG. 19 the interior of the box structure18D is coated with a metallic lining 152 to shield the magnetically encoded contents of the box from external radiation sources which might alter the information. A rubberized metallic gasket 150 forms a bead around the cover of the box to prevent leakage of radiation around the cover.

All of the components of the invention may be mass produced very inexpensively by injection molding plastic. Protection of the fragile disks with ease of visibility and access is combined with a very flexible self-supporting structure. Each envelope-like holder may be formd of transparent plastic for greater visibility in accessing the disks contained therein.

It is understood that the preceding description is given merely by way of illustation and not in limitation of the invention and that various modifications may be made thereto without departing from the spirit of the invention as claimed.

I claim:

1. Storage apparatus for flat disk-like objects wherein the disk-like objects may all be dispersed simultaneously for viewing and open selection, and wherein the storage apparatus comprises:
    a narrow upright box structure open on one long upright side of the box structure;
    slidably positioned within the box structure, a slidable member which supports a number of envelope-like holders, wherein the slidable member slides into and out of the box structure while slidably attached to the box structure thereby moving the envelope-like holders completely out of the box structure;
    movably attached to the slidable member by attaching means a number of envelope-like holders for disk-like objects positioned side by side, wherein each envelope-like holder may contain a disk-like object; and
    a means for simultaneous dispersement positioned between each adjacent pair of envelope-like holders for dispersing the disk-like objects all simultaneously in a spaced separated array for viewing and equal access to each disk-like object;
    and wherein the means for simultaneous dispersement comprises interconnecting tabular means between adjacent envelope-like holders.

2. Storage apparatus for flat disk-like objects wherein the disk-like objects may all be dispersed simultaneously for viewing and open selection, and wherein the storage apparatus comprises:
    a narrow upright box structure open on one long upright side of the box structure;
    slidably positioned within the box structure, a slidable member which supports a number of envelope-like holders, wherein the slidable member slides into and out of the box structure while slidably attached to the box structure thereby moving the envelope-like holders completely out of the box structure;

movably attached to the slidable member by attaching means a number of envelope-like holders for disk-like objects positioned side by side, wherein each envelope-like holder may contain a disk-like object; and a means for simultaneous dispersement positioned between each adjacent pair of envelope-like holders for dispersing the disk-like objects all simultaneously in a spaced separated array for viewing and equal access to each disk-like object;

and the means for simultaneous dispersement comprises mechanical separating means between adjacent envelope-like holders.

3. The invention of claim 1 wherein the slidable member comprises a vertical plate, slidably positioned within the box structure and wherein the envelope-like holders are movably attached to the vertical plate by a pivoting and laterally moving means such that the disks are dispersed by fanning out the envelope-like holders right or left.

4. The invention of claim 3 wherein the envelope-like holders are positioned vertically and the envelope-like holders are dispersed by interconnecting tabs between adjacent envelope-like holders.

5. The invention of claim 4 wherein each envelope-like holder further comprises a flexible planar extension beyond the envelope-like holder which planar extension attaches to an adjacent envelope-like holder to form a hinge-like element between adjacent envelope-like holders.

6. The invention of claim 5 wherein the planar extension of a first envelope-like holder comprises a bent portion at an outside end of the planar extentsion and the bent portion attaches to a second envelope-like holder, adjacent to the first, on the planar extension of the second envelope-like holder at a distance from the end of the second planar extension to permit a combined hinge and lateral extension action between the envelope-like holders.

7. The invention of claim 6 wherein each envelope-like holder further comprises, spaced immediately inwardly of an opposite end of the envelope-like holder from the planar extension end, a horizontal tab cut out of a first side member of each envelope-like holder, which tab bends outwardly and attaches to a second horizontal tab cut from a second side member of an adjacent envelope-like holder thereby forming a second interconnecting means between adjacent envelope-like holders.

8. The invention of claim 7 wherein an entire series of envelope-like holders is interconnected one to another by horizontal tabs adjacent an outer end and planar extension connections at an inner end.

9. The invention of claim 8 further comprising a holding plate pivotally attached to the slidable member, wherein the envelope-like holders are sandwiched between the vertical plate and the holding plate wherein the holding plate further comprises a bottom edge provided with a downwardly protruding tab, and wherein a base plate extends from the slidable member horizontally underneath the envelope-like holders and the base plate further comprises a mating slot to receive the tab from the holding plate to lock the envelope-like holders in a closed position for storage.

10. The invention of claim 9 wherein the holding plate further comprises a living hinge, formed in the normally flat position, and the holding plate is perpendicularly attached to the vertical plate so that as the holding plate is bent to secure the envelope-like holders for storage, the holding plate is held closed in a pretensioned condition so that the holding plate springs open automatically upon release.

11. The invention of claim 10 wherein the holding plate further comprises a pretensioned spring biased to maintain the holding plate in an open position.

12. The invention of claim 11 wherein an envelope-like holder adjacent to the vertical plate is flexibly connected to the vertical plate near an outside end of the holder by a plate having a living hinge thereby movably attaching the envelope-like holders to the vertical plate.

13. The invention of claim 12 wherein an envelope-like holder adjacent to the holding plate is secured to the holding plate along a common side.

14. The invention of claim 1 wherein each envelope-like holder is formed from an elongated substantially rectangular sheet of flexible material bent transversely at a point away from the middle of the sheet, folded over and an end of the folded portion connected to the remaining portion to leave a receiving portion for a disk-like object therebetween and an extending planar surface at one end, and wherein an elongated tab the length of the folded over portion secures the bottom of the receiving portion.

15. The invention of claim 14 wherein an end portion of the extending planar surface is bent and two envelope-like holders are interconnected by securing the bent over portion of one envelope-like holder to an extending planar portion of an adjacent envelope-like holder at a point slightly distant from the end of the extending planar portion.

16. The invention of claim 15 wherein each envelope-like holder, at an end opposite the extending planar surface, has a horizontal tab cut from each side of the receiving portion and the tabs of two adjacent envelope-like holders are interconnected.

17. The invention of claim 1 wherein the box structure further comprises a series of flared protrusions having smooth linear edges forming tracks, on the top, bottom and two sides of the box structure, extending from front to back, so that each box structure may be interlocked with any other box structure on any side of the box structure by sliding adjacent box structures together, thereby interlocking the flared protrusions between box structures to form an interconnected array of box structures, wherein each box may be inserted and removed independently to and from the array of boxes.

18. The invention of claim 17 further comprising a base support for the interconnected array of box structures, wherein the base support comprises a rigid elongated plate having a flat bottom surface and a top surface formed with a series of flared protrusions having smooth linear edges forming tracks extending from the top of the base support for receiving the flared protrusions from the bottom of the array of boxes, thereby interlocking the flared protrusions between the base support and box structures to form an interconnected array of the base support and box structures, wherein each box may be inserted and removed independently to and from the base support and array of boxes.

19. The invention of claim 1 wherein the box structure stores magnetic disks for computers further comprising a tightly sealed cover for the box structure and a metallic coating on all interior sides of the box structure and the cover to protect the information stored magnetically on the disks.

20. The invention of claim 19 further comprising a conductive resilient gasket seal between the cover and the box structure.

21. The invention of claim 2 wherein the slidable member comprises a base plate slidably connected to the box structure and each envelope-like holder is secured to the base plate by means of a living plastic hinge.

22. The invention of claim 2 wherein the means for dispersing the envelope-like holders comprises an elongated actuating member positioned across the envelope-like holders at an edge of the envelope-like holders, wherein each of a series of spaced protrusions from the actuating member fits between each of two adjacent envelope-like holders and a pivot connects the actuating member to a front edge of the base plate, so that upon pivoting the actuating member the spaced protrusions fan out the disk-like objects.

23. The invention of claim 22 wherein the actuating member further comprises a protruding handle which is used to actuate the actuating member.

24. The invention of claim 22 wherein two actuating members each fan a series of envelope-like holders in each of two opposing lateral directions from the base plate.

25. The invention of claim 21 further comprising an intermediate plate between the base plate and the box structure wherein the intermediate plate slidably connects to both the base plate and the box structure and serves to extend the base plate beyond the limit of the box structure a sufficient distance to enable the disk-like objects to fan out laterally outside of the box structure.

26. The invention of claim 2 wherein each envelope-like holder comprises a U-shaped frame having a central opening sufficiently large to enable a user's hand to grasp and remove a disk-like object from the envelope-like holder.

27. The invention of claim 21 wherein on at least one side of the box structure at least one button-like protrusion extends into the box interior and wherein the base plate further comprises an upright side wall rigidly attached to the base plate, wherein the side wall is provided with a horizontal slot to interact with each button-like protrusion from the box structure for sliding the base plate and attached side to the limit of the slot.

28. The invention of claim 21 wherein the envelope-like holders are hinged horizontally and the disks are dispersed by fanning out the holders from a vertical orientation downwardly toward a horizontal orientation.

29. The invention of claim 21 wherein the envelope-like holders are hinged vertically and the disks are dispersed by fanning out the holders right and left.

* * * * *